US009202265B2

(12) United States Patent
Tezaur (10) Patent No.: US 9,202,265 B2
(45) Date of Patent: Dec. 1, 2015

(54) POINT SPREAD FUNCTION COST FUNCTION WITH NON-UNIFORM WEIGHTS (71) Applicant: NIKON CORPORATION, Tokyo (JP)

(72) Inventor: Radka Tezaur, Belmont, CA (US)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 14/382,469

(22) PCT Filed: Mar. 14, 2013

(86) PCT No.: PCT/US2013/031651
§ 371 (c)(1),
(2) Date: Sep. 2, 2014

(87) PCT Pub. No.: WO2013/165595
PCT Pub. Date: Nov. 7, 2013

(65) Prior Publication Data
US 2015/0110405 A1 Apr. 23, 2015

Related U.S. Application Data (60) Provisional application No. 61/640,492, filed on Apr. 30, 2012.

(51) Int. Cl.
H04N 1/409 (2006.01)
G06K 9/46 (2006.01)
(Continued)

(52) U.S. Cl.
CPC .............. *G06T 5/003* (2013.01); *G06K 9/4638* (2013.01); *G06T 7/0085* (2013.01); *H04N 1/4092* (2013.01); *G06T 2207/10004* (2013.01); *G06T 2207/20056* (2013.01); *G06T 2207/20192* (2013.01)

(58) Field of Classification Search
None
See application file for complete search history.

(56) References Cited

U.S. PATENT DOCUMENTS 7,477,802 B2 1/2009 Milanfar et al.
7,486,318 B2 2/2009 Ohki
(Continued)

FOREIGN PATENT DOCUMENTS

WO WO2009128798 A1 10/2009
WO WO2009145931 A1 12/2009
(Continued)

OTHER PUBLICATIONS

Li, Junli, et al. "A blocked statistics method based on directional derivative." Web Information Systems and Mining. Springer Berlin Heidelberg, Oct. 26, 2012. pp. 90-97.*

(Continued)

*Primary Examiner* — Kim Vu
*Assistant Examiner* — Nathan Bloom
(74) *Attorney, Agent, or Firm* — Roeder & Broder LLP; Steven G. Roeder (57) ABSTRACT A PSF cost function used for determining a PSF kernel (438) of at least a portion of an image (16) includes (i) a first fidelity term having a first direction derivative, (ii) a first fidelity term weight for the first fidelity term, (iii) a second fidelity term having a second direction derivative, and (iv) a second fidelity term weight for the second fidelity term. Another PSF cost function for determining a PSF kernel (638) includes (i) a first fidelity term with a first derivative in a dominant edge direction (d), and (ii) a second fidelity term having a second derivative in a perpendicular direction(p) to the dominant edge direction.

20 Claims, 3 Drawing Sheets (51) Int. Cl.
*G06T 7/00* (2006.01)
*G06T 5/00* (2006.01)

(56) References Cited

U.S. PATENT DOCUMENTS

| | | | |
|---|---|---|---|
| 7,949,498 B2 | 5/2011 | Walker et al. | |
| 8,068,688 B2 | 11/2011 | Hong | |
| 8,165,347 B2 | 4/2012 | Heinzmann et al. | |
| 8,538,140 B2 | 9/2013 | Farid et al. | |
| 8,687,909 B2 | 4/2014 | Tezaur | |
| 2004/0096125 A1 | 5/2004 | Alderson et al. | |
| 2010/0002955 A1 | 1/2010 | George et al. | |
| 2010/0053346 A1* | 3/2010 | Mitsunaga | H04N 5/23248 348/208.6 |
| 2010/0166332 A1* | 7/2010 | Lee | G06T 5/003 382/255 |
| 2010/0231732 A1* | 9/2010 | Baxansky | G06T 5/003 348/208.4 |
| 2011/0285680 A1 | 11/2011 | Nakamura | |
| 2013/0163882 A1* | 6/2013 | Smith | G06T 5/003 382/199 |
| 2015/0110404 A1* | 4/2015 | Cho | G06T 5/003 382/195 |
| 2015/0254814 A1* | 9/2015 | Ali | G06K 9/40 382/255 |

FOREIGN PATENT DOCUMENTS

| | | |
|---|---|---|
| WO | WO2010008802 A1 | 1/2010 |
| WO | WO2013148139 A1 | 10/2013 |
| WO | WO2013148142 A1 | 10/2013 |

OTHER PUBLICATIONS

Shan, Qi, Jiaya Jia, and Aseem Agarwala. "High-quality motion deblurring from a single image." ACM Transactions on Graphics (TOG). vol. 27. No. 3. ACM, 2008.*

Nikolova, Mila. "Minimizers of cost-functions involving nonsmooth data-fidelity terms. Application to the processing of outliers." SIAM Journal on Numerical Analysis 40.3 (2002): 965-994.*

Cho, et al. "Fast Motion Deblurring", ACM Transactions on Graphics (SIGGRAPH Asia 2009), vol. 28, No. 5, article No. 145, Dec. 2009.

Xu, et al. "Two-Phase Kernel Estimation for Robust Motion Deblurring", ECCV 2010, Part I, LCNS 6311, pp. 157-170, Springer-Verlag Berlin Heidelberg, 2010.

The International Search Report and Written Opinion of the International Searching Authority, Jun. 11, 2013, Nikon Corporation, PCT/US13/31651. (related application).

The International Preliminary Report on Patentability, Nov. 4, 2014, Nikon Corporation, PCT/US13/31651 (related application).

* cited by examiner

POINT SPREAD FUNCTION COST FUNCTION WITH NON-UNIFORM WEIGHTS

RELATED INVENTION

This application claims priority on U.S. Provisional Application Ser. No. 61/640,492, filed Apr. 30, 2012 and entitled "POINT SPREAD FUNCTION COST FUNCTION WITH NON-UNIFORM WEIGHTS". As far as permitted, the contents of U.S. Provisional Application Ser. No. 61/640,492 are incorporated herein by reference.

BACKGROUND

Cameras are commonly used to capture an image of a scene that includes one or more objects. Unfortunately, some of the images are blurred. For example, movement of the camera and/or movement of the objects in the scene during the exposure time of the camera can cause the image to be blurred. Further, if the camera is not properly focused when the image is captured, the image can be blurred.

When blur is sufficiently spatially uniform, a blurred captured image can be modeled as the convolution of a latent sharp image with some point spread function ("PSF") plus noise, $$B=K*L+N. \quad \text{Equation (1)}$$

In Equation 1 and elsewhere in this document, (i) "B" represents a blurry image, (ii) "L" represents a latent sharp image, (iii) "K" represents a PSF kernel, and (iv) "N" represents noise (including quantization errors, compression artifacts, etc.). A blind deconvolution problem seeks to recover both the PSF kernel K and the latent sharp image L. The blind deconvolution problem is often very difficult to accurately solve.

One common approach to solving a deconvolution problem includes reformulating it as an optimization problem in which suitable cost functions are minimized in order to find a solution to the deconvolution problem. For example, the blind deconvolution problem is often solved in iterations by minimizing two cost functions in alternating fashion. More specifically, the blind deconvolution problem is often solved in iterations by minimizing a latent sharp image estimation cost function, and by minimizing a PSF estimation cost function in alternating fashion.

A relatively common type of a cost function used for deconvolution is a regularized least squares cost function. Typically, a regularized least squares cost function consists of (i) one or more fidelity terms, which make the minimum conform to equation (1) modeling of the blurring process, and (ii) one or more regularization terms, which make the solution more stable and help to enforce prior information about the solution, such as sparseness.

One example of a PSF estimation cost function is provided in below in Equation 2:

$$c(K)=\|L_x*K-B_x\|^2+\|L_y*K-B_y\|^2+\theta\|K\|^2+\sigma(\|K_x\|^2+\|K_y\|^2). \quad \text{Equation (2).}$$

In Equation 2, c(K) is the PSF estimation cost function, K denotes the PSF kernel that is to be estimated, B is a given blurry image, L is an estimate of the latent sharp image, θ and σ are regularization term weights, and subscripts x and y denote derivatives in x- and y-direction. If the convolution operator * is assumed to be periodic, the minimum of the PSF cost function in Equation 2 can be found very quickly, by evaluating a closed form formula for the minimum in the Fourier domain, and the Fast Fourier Transform can be used for an efficient implementation.

Unfortunately, many blurry images include areas that complicate the problem of accurately determining the PSF kernel. For example, when the blurry image contains more strong edges in some directions than in others, the estimated PSF kernel tends to be inaccurate. More specifically, when strong straight edges are present in the blurry image, the PSF kernel estimated by minimizing the PSF cost function in Equation 2 tends to contain strong artifacts having the form of streaks along the dominant edge direction. Thus, existing regularized least squares cost functions are not entirely satisfactory.

SUMMARY

The present invention is directed to a method for determining a PSF kernel for at least a portion of a blurred image. In one embodiment, the method includes the step of estimating the PSF kernel for at a least a portion of the image with a PSF cost function having (i) a first fidelity term that includes a derivative in a first direction ("sometimes referred to as a "first direction derivative"), (ii) a first weight for the first fidelity term, (iii) a second fidelity term that includes a derivative in a second direction ("sometimes referred to as a "second direction derivative") that is different from the first direction, and (iv) a second weight for the second fidelity term, the second weight being different from the first weight.

As provided herein, the undesirable artifacts in estimated PSF kernels can be reduced by using multiple fidelity terms involving image derivatives with non-uniform weights. This will lead to a more accurate estimated PSF kernel and a better deconvoluted image.

Additionally, the PSF cost function can include a third fidelity term that includes a derivative in a third direction ("sometimes referred to as a "third direction derivative"), and a third weight for the third fidelity term. In this embodiment, the third direction is different from the first direction and the second direction, and the third weight can be different from the second weight and the first weight.

Moreover, the PSF cost function can include a fourth fidelity term that includes a derivative in a fourth direction ("sometimes referred to as a "fourth direction derivative"), and a fourth weight for the fourth fidelity term. In this embodiment, the fourth direction is different from the first direction, the second direction, and the third direction, and the fourth weight can be different from the third weight, the second weight, and the first weight.

Further, the PSF cost function can include a fifth fidelity term that includes a derivative in a fifth direction ("sometimes referred to as a "fifth direction derivative"), and a fifth weight for the fifth fidelity term. In this embodiment, the fifth direction is different from the first direction, the second direction, the third direction, and the fourth direction, and the fifth weight can be different from the fourth weight, the third weight, the second weight, and the first weight.

As provided herein, each of the direction derivatives can be written as a linear combination of the derivatives in the x and y directions or two other directions. With this design, the computational complexity of finding the minimum of the resulting cost function can be reduced by exploiting the linearity of differential and Fourier transform operator. This will speed up the deblurring of images and will allow for image deblurring with less powerful processors (e.g. processors in cameras).

The present invention is direct to a method for determining a PSF kernel for at least a portion of an image that includes a dominant edge direction. In one embodiment, the method includes the steps of (i) determining the dominant edge direction of at least a portion of the image; (ii) determining a perpendicular direction that is perpendicular to the dominant edge direction; and (iii) estimating a PSF kernel with a PSF cost function having a first fidelity term having a derivative in the dominant edge direction, and a second fidelity term having a derivative in the perpendicular direction.

In this embodiment, the first fidelity term can include a first weight and the second fidelity term can include a second weight that is different than the first weight. Further, the first weight can be greater than the second weight.

As provided herein, the undesirable artifacts in estimated PSF kernels are reduced by using in the cost function fidelity terms derivatives in the dominant edges direction and the direction perpendicular to it, instead of x- and y-derivatives, and by setting non-uniform weights for these fidelity terms that emphasize the dominant straight line edge direction. This can help to reduce the influence of the dominant edges in the blurry image on the estimated PSF and the reconstructed latent sharp image and to promote sharp edges in the latent sharp image. This improves the quality of the deblurred image.

The present invention is also directed to a method for deblurring a blurry image. The method can include the steps of determining the PSF kernel utilizing one of the methods provided herein, and deblurring the image utilizing the determined PSF kernel.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
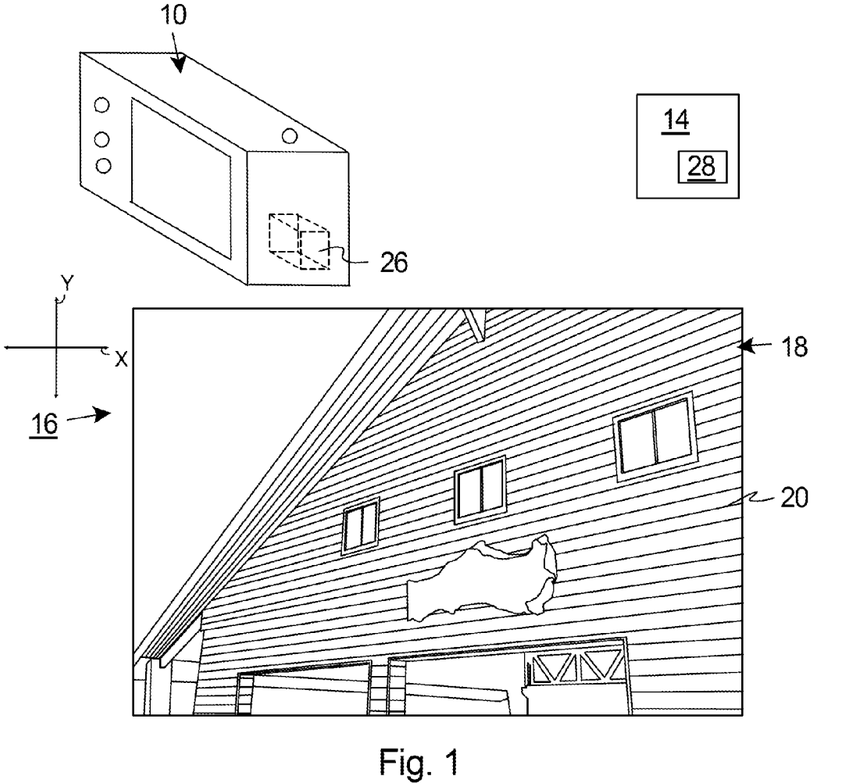
FIG. 1 is a simplified view of a computer having features of the present invention, an image apparatus having features of the present invention, and a captured image.

FIG. 1 is a simplified perspective view of an image apparatus 10 (e.g. a digital camera), a computer 14 (illustrated as a box), and a captured image 16 (illustrated away from the image apparatus 10) of a scene (not shown) that has been captured by the image apparatus 10. In FIG. 1, the captured image 16 is slightly blurred. For example, movement of the image apparatus 10, and/or movement of one or more objects in the scene during the capturing of the blurred image 16 can cause image blur. Additionally, or in the alternative, blur in the image 16 can be caused by the image apparatus 10 not being properly focused when the image 16 is captured.

As an overview, in certain embodiments, the present invention is directed to a couple of alternative methods for determining a PSF kernel for a portion or all of a blurred image. As provided herein, in certain embodiments, the new methods can be used to provide a more accurate PSF kernel. As a non-exclusive example, the new methods can be used to provide a more accurate PSF kernel when the blurred image contains more strong edges in some directions than in others. Further, if the PSF kernel is more accurate, the resulting deblurred image will be improved.

Moreover, the methods provided herein can be solved relatively easily. This will speed up the deblurring of images and will allow for image deblurring with less powerful processors (e.g. processors in the camera 10).

Some of the Figures provided herein include an orientation system that designates an X axis, and a Y axis. It should be understood that the orientation system is merely for reference and can be varied. For example, the X axis can be switched with the Y axis. Moreover, these axes can alternatively be referred to as a first axis, or a second axis.

The type of scene captured by the image apparatus 10 can vary. As a non-exclusive example, the captured image 16 illustrated in FIG. 1 includes a building 18 that has many strong, straight edges 20 that extend substantially laterally. Alternatively, the captured image 16 can include other types of features, objects, or structures. Further, the captured image 16 can have strong straight edges oriented in a different fashion or in a more random fashion than that illustrated in FIG. 1. Still alternatively, the captured image 16 may not include strong, straight edges.

In one embodiment, as provided herein, the image apparatus 10 can include a control system 26 that uses one or more of the algorithms provided herein for determining the PSF kernel(s) and subsequently deconvoluting the blurred image 16 to provide an adjusted image (not shown). Alternatively, the computer 14 can include a control system 28 that uses one or more of the algorithms for determining the PSF kernel(s) and subsequently deconvoluting the blurred image 16. In either event, the control system 26, 28 can provide a deblurred image from the blurred image 16.

Each control system 26, 28 can include one or more processors and circuits. Further, either of the control systems 26, 28 can include software that utilizes one or more methods provided herein to estimate the one or more PSF kernels and deblur the blurry image 16.

As provided herein, the present invention provides a couple of alternative PSF estimation cost functions that can be used for determining a single PSF kernel for the entire blurred image 16. Alternatively, the captured image 16 can be divided into a number of segments, and the PSF estimation cost functions provided herein can be used to estimate a different PSF kernel for one or more of the segments. In one non-exclusive embodiment, a separate PSF kernel can be determined for each of the segments.

Figure 2:
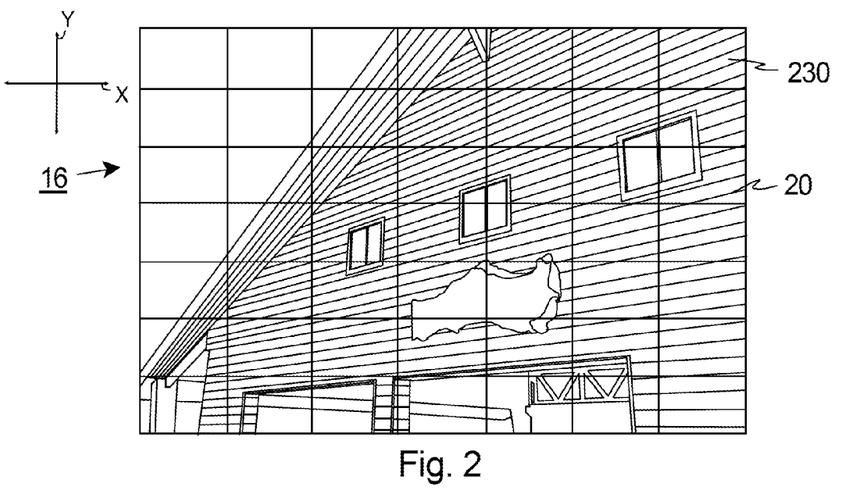
FIG. 2 illustrates the captured image of FIG. 1 divided into a plurality of segments.

FIG. 2 illustrates the captured image 16 of FIG. 1 divided into a plurality of segments 230. The size, shape and number of the segments 230 can be varied. For example, in FIG. 2, each segment 230 is generally rectangular shaped and the image 16 is divided into a seven by seven grid that includes forty-nine segments 230. Alternatively, the shape and/or number segments 230 can be different than that illustrated in FIG. 2.

It should be noted that many of the segments 230 in FIG. 2 have captured strong edges 20. However, the direction of the strong edges 20 is not exactly the same in each of the segments 230.

As provided herein, the algorithms used for solving the blind deconvolution problem estimate both the PSF kernel K and the latent sharp image L. In certain embodiments, these algorithms are iterative and usually they alternate, improving the current estimates of the PSF kernel and the latent sharp image. The steps of improving the current estimate of the PSF kernel and the current estimate of the latent sharp image are typically in the form of solving an optimization problem. For blind deconvolution, (i) a PSF estimation cost function is formulated and minimized to find a solution for the PSF blur kernel estimate, and (ii) a latent sharp image estimation cost function is formulated and minimized to find a solution for the latent sharp image estimate. With this design, the PSF estimation and the latent sharp image estimation can be solved in iterations by minimizing the PSF estimation cost function, and by minimizing the latent sharp image estimation cost function in alternating fashion.

In addition to alternating minimization of the PSF estimation cost function, and the latent sharp image estimation cost function, it is also common to use a multi-resolution approach, where first the coarse versions of the latent sharp image L and the PSF kernel K are estimated using a heavily downsampled blurry image, and then these estimates are refined at higher and higher resolution, until the full resolution of the given blurred image is reached. The number of iterations for each resolution can be varied to achieve desired level of deblurring.

The optimization problem can be performed for the entire blurred image 16 or the optimization problem can be performed for one or more of the segments 230.

One of the most common approaches to image deconvolution is re-formulating it as a regularized least squares problem. Suitable latent sharp image estimation cost functions that can be used with the present invention are known by those skilled in the art.

In one embodiment, the unique PSF estimation cost function provided herein is a modified regularized least squares cost function that includes multiple fidelity terms involving image derivatives, with non-uniform weights. Further, in certain embodiments, the computational complexity of finding the minimum of the resulting PSF estimation cost function can be reduced by exploiting the linearity of the differential and Fourier transform operator.

More specifically, in one embodiment, the accuracy of the PSF kernel can be increased, and the imbalance caused by the strong edges can be reduced by using image derivatives not only in x direction and the y direction, but in a larger number of directions, and assigning the fidelity terms involving these derivatives, non-uniform weights that emphasize the directions that coincide with the directions of the strong edges present in the image. Stated in another fashion, in one embodiment, the PSF estimation cost function includes more than two fidelity terms (more than just an X derivative and a Y derivative fidelity terms); and each fidelity term is assigned a separate, non-uniform fidelity term weight. Further, each fidelity term weight is sized to emphasis the fidelity terms having directions that coincide with the directions of the strong edges, and de-emphasize the fidelity terms having directions that do not coincide with the directions of the strong edges.

The number of different fidelity terms used in the PSF estimation cost function can be varied. As alternative, non-exclusive examples, the PSF estimation cost function can include 3, 4, 5, 6, 7, 8, 9, 10, 11, or 12 different fidelity terms, with each fidelity term being associated with a different direction. However, the number of different fidelity terms can be different than these examples.

Figure 3:
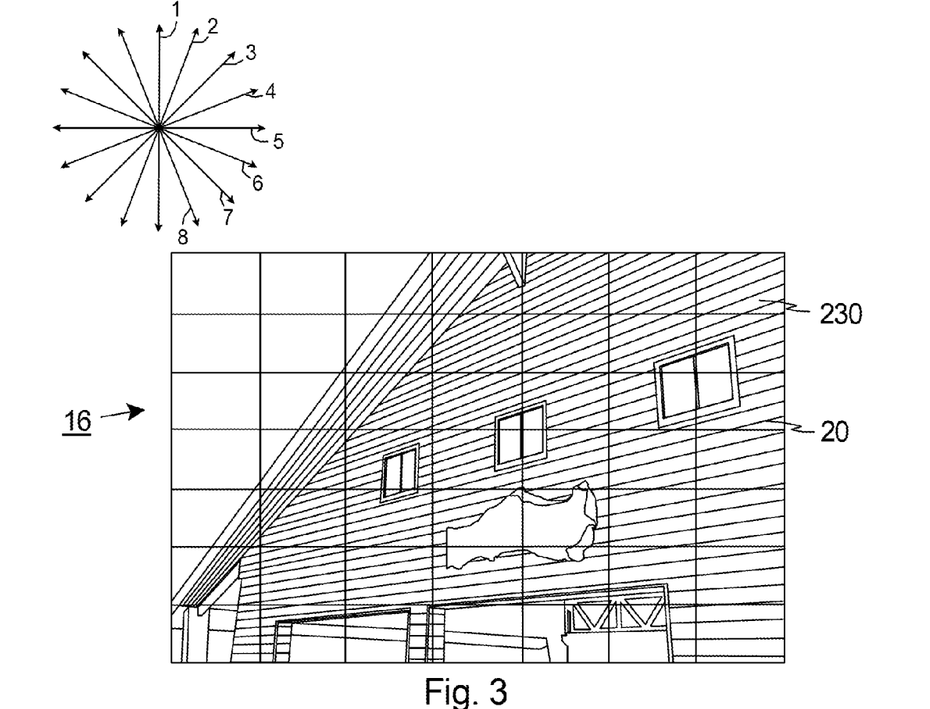
FIG. 3 illustrates the segmented image of FIG. 2 and a coordinate system that illustrates a plurality of alternative directions.

In one non-exclusive example, the PSF estimation cost function is a modified regularized least squares cost function that includes eight different fidelity terms, with each fidelity term having a different directional derivative, and each fidelity term has its own fidelity term weight. For example, FIG. 3 illustrates the captured image 16 of FIG. 2 and a coordinate system that illustrates a plurality of alternative directions, namely eight in this example. These alternative directions have been labeled one through eight for convenience, and the directions are equally spaced at angles of twenty-two and one-half degrees. Also, the direction labeled as one can be referred to as the Y direction, and the direction labeled as five can also be referred to as the X direction. In this example, the PSF estimation cost function provided in Equation 2 can be modified to read as follows:

$$c(K) = \xi_1 \|L_{\alpha_1} * K - B_{\alpha_1}\|^2 + \xi_2 \|L_{\alpha_2} * K - B_{\alpha_2}\|^2 + \xi_3 \|L_{\alpha_3} * K - B_{\alpha_3}\|^2 + \xi_4 \|L_{\alpha_4} * K - B_{\alpha_4}\|^2 + \xi_5 \|L_{\alpha_5} * K - B_{\alpha_5}\|^2 + \xi_6 \|L_{\alpha_6} * K - B_{\alpha_6}\|^2 + \xi_7 \|L_{\alpha_7} * K - B_{\alpha_7}\|^2 + \xi_8 \|L_{\alpha_8} * K - B_{\alpha_8}\|^2 + \theta \|K\|^2 + \sigma(\|K_x\|^2 + \|K_y\|^2).$$ Equation (3).

In Equation 3, the PSF estimation cost function c(K) includes (i) a first fidelity term $\|L_{\alpha_1} * K - B_{\alpha_1}\|^2$ for the first direction (the Y direction in this example), and a first fidelity term weight $\xi_1$ for the first fidelity term; (ii) a second fidelity term $\|L_{\alpha_2} * K - B_{\alpha_2}\|^2$ for the second direction, and a second fidelity term weight $\xi_2$ for the second fidelity term; (iii) a third fidelity term $\|L_{\alpha_3} * K - B_{\alpha_3}\|^2$ for the third direction, and a third fidelity term weight $\xi_3$ for the third fidelity term; (iv) a fourth fidelity term $\|L_{\alpha_4} * K - B_{\alpha_4}\|^2$ for the fourth direction, and a fourth fidelity term weight $\xi_4$ for the fourth fidelity term; (v) a fifth fidelity term $\|L_{\alpha_5} * K - B_{\alpha_5}\|^2$ for the fifth direction (the X direction in this example), and a fifth fidelity term weight $\xi_5$ for the fifth fidelity term; (vi) a sixth fidelity term $\|L_{\alpha_6} * K - B_{\alpha_6}\|^2$ for the sixth direction, and a sixth fidelity term weight $\xi_6$ for the sixth fidelity term; (vii) a seventh fidelity term $\|L_{\alpha_7} * K - B_{\alpha_7}\|^2$ for the seventh direction, and a seventh fidelity term weight $\xi_7$ for the seventh fidelity term; and (viii) an eighth fidelity term $\|L_{\alpha_8} * K - B_{\alpha_8}\|^2$ for the eighth direction, and an eighth fidelity term weight $\xi_8$ for the eighth fidelity term.

The fidelity terms make the estimated PSF K conform to the model in Equation (1) with the noise as small as possible. In Equation 3, (i) $L_{\alpha_1}$ is the latent sharp image derivative along the first direction, and $B_{\alpha_1}$ is the blurred image derivative along the first direction; (ii) $L_{\alpha_2}$ is the latent sharp image derivative along the second direction, and $B_{\alpha_2}$ is the blurred image derivative along the second direction; (iii) $L_{\alpha_3}$ is the latent sharp image derivative along the third direction, and $B_{\alpha_3}$ is the blurred image derivative along the third direction; (iv) $L_{\alpha_4}$ is the latent sharp image derivative along the fourth direction, and $B_{\alpha_4}$ is the blurred image derivative along the fourth direction; (v) $L_{\alpha_5}$ is the latent sharp image derivative along the fifth direction, and $B_{\alpha_5}$ is the blurred image derivative along the fifth direction; (vi) $L_{\alpha_6}$ is the latent sharp image derivative along the sixth direction, and $B_{\alpha_6}$ is the blurred image derivative along the sixth direction; (vii) $L_{\alpha_7}$ is the latent sharp image derivative along the seventh direction, and $B_{\alpha_7}$ is the blurred image derivative along the seventh direction; and (viii) $L_{\alpha_8}$ is the latent sharp image derivative along the eighth direction, and $B_{\alpha_8}$ is the blurred image derivative along the eighth direction. As provided below, in certain embodiments, the derivatives are computed as the linear combinations of the x and y derivatives.

As provided above, the fidelity term weights $\xi_j$ (j=1, ..., 8), are sized to emphasis the fidelity terms having directions that coincide with the directions of the strong edges, and de-emphasis the fidelity terms having directions that do not coincide with the directions of the strong edges.

In the example illustrated in FIG. 3, the image 16 has many strong edges 20 that are probably most closely aligned with the fourth direction, and these strong edges 20 are substantially perpendicular to the eighth direction. In this example, the value of fourth fidelity term weight will be set to be highest, and the value of the eighth fidelity term weight will be set to be the lowest. As a result thereof, this will put emphasis on the fourth fidelity term, and de-emphasis the eighth fidelity term. In this example, the values of the fidelity term weights of the remaining directions will be in between these amounts. As provided herein, the greater the number of strong edges in a particular direction, the greater the weight will be in the direction aligned with the strong edges.

Further, in Equation 3, (i) the terms $\|K\|^2$ and $(\|K_x\|^2+\|K_y\|^2)$ are regularization terms that help to deal with the ill-conditioned nature of the problem and noise magnification; and (ii) $\theta$ and $\sigma$ are regularization term weights that are used to provide the proper balance between the regularization terms and the fidelity terms. The regularization term weights can be determined using experiments with selected images and PSFs, trying different values and picking those that yield the best results. Further, in Equation 3, (i) K is the PSF blur kernel, (ii) $K_x$ is the PSF derivative along the fifth direction (the X direction), and (iii) $K_y$ is the PSF derivative along the first direction (the Y direction).

It should be noted that other regularization terms can be used instead of or in addition to the regularization terms provided in Equation 3. It should also be noted that, as used herein "|| ||" will mean the square root of the sum of the squares (2-norm). However, it is possible to use the idea of non-uniform weights, with cost functions involving other norms or pseudonorms, such as the sum of absolute values (1-norm). The other norms are more commonly used in the regularization term(s), but possibly also in the fidelity terms. The formulas for the solutions provided herein are for 2-norm. For other norms minimizing the cost function is more complicated and is usually done by some iterative algorithm such as a variable splitting algorithm.

As provided herein, the PSF estimation cost function (of Equation 3) for PSF kernel K with non-uniform weights can be rewritten in a more generic format as follows:

$$c(K) = \sum_{j=1}^{J} \xi_j \|K * L\alpha_j - B\alpha_j\|^2 + \theta \|K\|^2 + \sigma(\|K_x\|^2 + \|K_y\|^2).\qquad \text{Equation 4}$$

In Equation 4, the summation is over j, and J is equal to the number of individual different directions used. Thus, if the number of directions is eight, J will have a value of eight (J=8), and j will have a value of one through eight (j=1, 2, 3, ... J). Further, $\alpha_j$ are the individual directions. In this example, the number of individual directions can be set to be eight, and $\alpha_j = j\pi/8$.

Moreover, in Equation 4, $\xi_j$ are non-uniform fidelity term weights for the individual directions. Additionally, the term $\|L_{\alpha_j} * K - B_{\alpha_j}\|^2$ is the generic fidelity term with (i) $L_{\alpha_j}$ representing the latent sharp image derivative along the respective direction, and (ii) $B_{\alpha_j}$ representing the blurred image derivative along the respective direction.

There are a number of ways to calculate the value of the fidelity term weights. One, non-exclusive example for calculating the fidelity term weights utilizes the strength of gradients for each direction (denoted by s with the angle as the subscript). This example is provided in Equation 4A below:

$$\xi_j = \left(\frac{s_{\alpha j} + \pi/2}{r}\right)^q. \qquad \text{Equation (4A)}$$

In Equation 4A, r can be calculated below:

$$r = \frac{\sum_{j=1}^{J} s_{\alpha j}}{J}. \qquad \text{Equation 4B}$$

In Equation 4A, q is a parameter that can help to fine-tune the algorithm. The default value is q=1. However, the default value can be increased to emphasize the dominant edge direction more strongly or decreased to deemphasize the other directions. Further, in these equations, $s_{\alpha j}$ is the gradient strength for the individual directions.

In one, non-exclusive embodiment, the gradient strength for each of the individual directions is calculated by first calculating the latent sharp image derivatives for the x- and y-directions ($L_x$ and $L_y$). Next, a gradient magnitude G can be calculated. For example, the gradient magnitude can be calculated with this equation $G=(L_x+L_y)^{1/2}$. Next, (in an optional step) a threshold for significant gradient magnitude is selected. Subsequently, the thresholding is applied to the gradient magnitudes G of the pixels (e.g. all values that are smaller than the threshold are set to 0). Next, for each pixel for which the gradient magnitude is greater than zero (G>0), the gradient direction is computed. Subsequently, the computed directions are "rounded" or "quantized" to be one of the eight directions $\alpha_j$:

$$s_\alpha \Sigma G_{i_\alpha}{}^t. \qquad \text{Equation (5)}$$

In Equation 5, $s_\alpha$ is the gradient strength of all the pixels with the gradient direction $\alpha$, and $G_{i_\alpha}$ is gradient magnitude at the pixel $i_\alpha$. In Equation 5, summing over all pixels $i_\alpha$ for which $G_{i_\alpha} > 0$ and the gradient direction equals $\alpha$. Here, t is a parameter that can be selected to fine tune the performance of the algorithm. In certain experiments, t=0 often yielded the best performance, but other values, such as t=2, may sometimes be useful.

Additionally, Equation 4 includes (i) the regularization terms $\|K\|^2$ and $(\|K_x\|^2+\|K_y\|^2)$, and (ii) the $\theta$ and $\sigma$ are regularization term weights same as in Equation 3. In Equation 4, the subscripts x and y denote derivatives in x- and y-direction. It should be noted that in the example with eight directions, the x direction is the same as the fifth direction, and the y direction is the same as the first direction.

As provided herein, a Fourier domain closed form formula for the minimum of the PSF estimation cost function of Equation 4 can be derived, similarly as for the original PSF estimation cost function of Equation 2 with x- and y-derivatives only. The following is the Fourier domain closed form formula for Equation 4:

$$F(K) = \frac{\sum_{j=1}^{J} \xi_j \overline{F(L_{\alpha_j})} F(B_{\alpha_j})}{\sum_{j=1}^{J} \xi_j \overline{F(L_{\alpha_j})} F(L_{\alpha_j}) + \theta + \sigma(\overline{F(D_x)} F(D_x) + \overline{F(D_y)} F(D_y))}.$$

Equation (9)

If Equation 9 is used for the implementation directly, the latent sharp image derivative ($L_{\alpha_j}$), and the blurry image derivatives ($B_{\alpha_j}$) in all J directions need to be computed, and also the Fourier Transform of each of these derivatives ($L_{\alpha_j}$), ($B_{\alpha_j}$) needs to be computed. Depending upon the number of directions, this will be considerably slower than when only x- and y-derivatives are used.

However, in certain embodiments, as provided herein, Equation (9) can be solved in a more efficient manner. More specifically, as provided herein, it is possible to rewrite the formula in a more efficient manner, exploiting the fact that both the Fourier transform operator and the differential operators are linear and the derivative in an arbitrary direction can be written as a linear combination of derivatives in the x direction and the y direction. For example, (i) Equation 10 below illustrates how the latent sharp image derivative ($L_{\alpha_j}$) in each of the directions can be written as a linear combination of the derivatives in the x and y directions; and (ii) somewhat similarly Equation 11 below illustrates how the blurred image derivative ($B_{\alpha_j}$) in each of the directions can be written as a linear combination of the derivatives in the x and y directions.

$$L_{\alpha_j} = \cos \alpha_j L_x + \sin \alpha_j L_y.$$

Equation (10)

$$B_{\alpha_j} = \cos \alpha_j B_x + \sin \alpha_j B_y.$$

Equation (11)

As a result thereof, one relevant part (the numerator) of Equation 9 can be rewritten in the following manner:

$$\sum_{j=1}^{J} \xi_j \overline{F(L_{\alpha_j})} F(B_{\alpha_j}) = \left(\sum_{j=1}^{J} \xi_j \cos^2(\alpha_j)\right) \overline{F(L_x)} F(B_x) +$$

$$\left(\sum_{j=1}^{J} \xi_j \cos(\alpha_j)\sin(\alpha_j)\right) \overline{F(L_x)} F(B_y) +$$

$$\left(\sum_{j=1}^{J} \xi_j \sin(\alpha_j)\cos(\alpha_j)\right) \overline{F(L_y)} F(B_x) +$$

$$\left(\sum_{j=1}^{J} \xi_j \sin^2(\alpha_j)\right) \overline{F(L_y)} F(B_y).$$

Equation (12)

Somewhat similarly, another relevant part (in the denominator) of Equation 5 can be rewritten in the following manner:

$$\sum_{j=1}^{J} \xi_j \overline{F(L_{\alpha_j})} F(L_{\alpha_j}) = \left(\sum_{j=1}^{J} \xi_j \cos^2(\alpha_j)\right) \overline{F(L_x)} F(L_x) +$$

$$\left(\sum_{j=1}^{J} \xi_j \cos(\alpha_j)\sin(\alpha_j)\right) \overline{F(L_x)} F(L_x) +$$

$$\left(\sum_{j=1}^{J} \xi_j \sin(\alpha_j)\cos(\alpha_j)\right) \overline{F(L_y)} F(L_x) +$$

Equation (13)

$$\left(\sum_{j=1}^{J} \xi_j \sin^2(\alpha_j)\right) F(L_y) \overline{F(L_y)}.$$

In both Equations 12 and 13, the sums over j are replaced by four terms only. Equation 9 can be rewritten using Equations 12 and 13 as follows:

$$F(K) = \frac{b_1 \overline{F(L_x)} F(B_x) + b_2(\overline{F(L_x)} F(B_y) + \overline{F(L_y)} F(B_x)) + b_3 \overline{F(L_y)} F(B_y)}{b_1 \overline{F(L_x)} F(L_x) + 2b_2 Re(\overline{F(L_x)} F(L_y)) + b_3 \overline{F(L_y)} F(L_y) + \theta + \sigma(\overline{F(D_x)} F(D_x) + \overline{F(D_y)} F(D_y))}.$$

Equation (14)

In Equation (14), $b_1$, $b_2$, and $b_3$ have the following values:

$$b_1 = \sum_{j=1}^{J} \xi_j (\cos(\alpha_j))^2,$$

Equation (15)

$$b_2 = \sum_{j=1}^{J} \xi_j \cos(\alpha_j)\sin(\alpha_j),$$

Equation (16)

$$b_3 = \sum_{j=1}^{J} \xi_j (\sin(\alpha_j))^2.$$

Equation (17)

Further, in Equation (14), Re is the real part of a complex number. It shows up in the formula because two terms that are the complex conjugate of each other are added (the real parts add and the imaginary ones cancel).

With this design, in order to solve Equation 14, it is only necessary to compute only x- and y-derivatives of latent sharp image L and blurry image B, and their Fourier Transform. This new, more efficient formula is obtained by using steerable derivative filters (linear combinations of Dx and Dy) and the linearity of the Fourier transform operator. This will significantly speed up the solving of resulting algorithm. Accordingly, as provided herein, the new PSF algorithm helps to improve the accuracy of PSF estimation. Further, in certain embodiments, the increase in computational complexity is only moderate, due to efficient implementation that exploits the linearity of the Fourier Transforms and differential operators.

Figure 4:
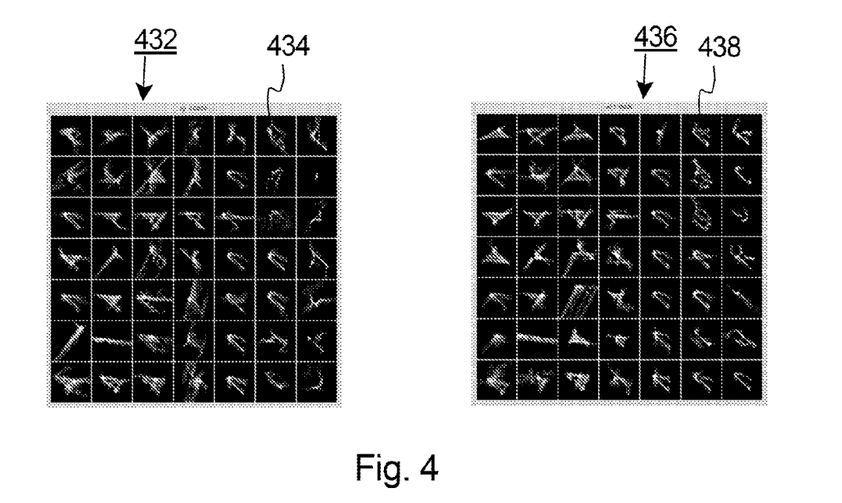
FIG. 4 illustrates (i) an estimated PSF kernel for each of the segments of the captured image of FIG. 2, determined with a prior art PSF estimation cost function, and (ii) an estimated PSF kernel for each segment of the captured image of FIG. 2, determined with a first PSF estimation cost function having features of the present invention.

FIG. 4 illustrates a prior art PSF map 432 (on the left) that includes an estimated PSF kernel 434 for each of the segments of the captured image of FIG. 3, determined with a prior art PSF estimation cost function. As illustrated in FIG. 4, some of the estimated PSF kernels 434 contain strong, undesirable artifacts having the form of streaks that extend along the dominant edge direction of the strong edges 20 (illustrated in FIG. 2).

FIG. 4 also illustrates a new PSF map 436 (on the right) that includes an estimated PSF kernel 438 for each of the segments of the captured image of FIG. 2, determined with the PSF estimation cost function of Equation 4. As illustrated in FIG. 4, the estimated PSF kernels 438 have less undesirable artifacts having the form of streaks that extend along the dominant edge direction. Accordingly, these estimated PSF kernels 438 are believed to be more accurate.

In another embodiment of the present invention, the undesirable artifacts in estimated PSF kernels can be reduced by using a PSF estimation cost function having a fidelity term with a derivative in a dominant edge direction ("d"), and a fidelity term with a derivative in a direction perpendicular ("perpendicular direction p") to the dominant edge direction, instead of x- and y-derivatives. Further, in this example, a non-uniform fidelity term weight can be used for each fidelity term, and the fidelity term weights can be sized to emphasize the dominant edge direction and deemphasize the perpendicular direction.

Stated in another fashion, the streak artifacts in the PSF kernel that are due to long straight edges in the blurred image can be reduced by modifying the fidelity terms of the PSF estimation cost function involving image derivatives. In particular, the artifacts can be reduced by replacing the derivatives in x- and y-direction by the derivatives in the dominant edge direction and the direction perpendicular to it, and by assigning these terms non-uniform fidelity term weights that emphasize the dominant straight line edge direction.

Figure 5:
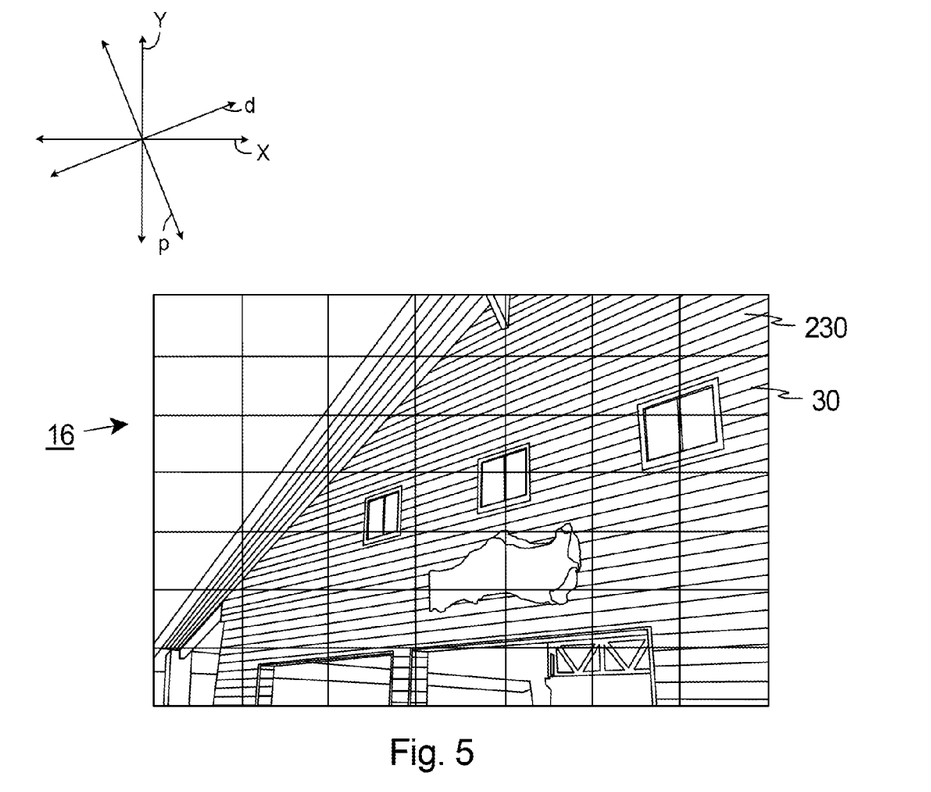
FIG. 5 illustrates the segmented image of FIG. 2 and an alternative coordinate system.

FIG. 5 illustrates the captured image 16 of FIG. 2 and a coordinate system that illustrates the X and Y directions, as well as the dominate direction d and the perpendicular direction p.

In this embodiment, the PSF estimation cost function from Equation 2 can be replaced by a following, new PSF estimation cost function, $$c(K) = \xi_d \|L_d * K - B_d\|^2 + \xi_p \|L_p * K - B_p\|^2 + \theta \|K\|^2 + \sigma(\|K_x\|^2 + K_y\|^2). \quad \text{Equation (18)}$$

In Equation 18, (i) subscript d is the dominant edge direction ("dominant direction"); (ii) subscript p is the direction perpendicular ("perpendicular direction") to the dominant direction; (iii) $\|L_d * K - B_d\|^2$ is a dominate direction fidelity term that includes $L_d$ (the latent sharp image derivative along the dominate direction), and $B_d$ (the blurred image derivative along the dominate direction); (iv) $\|L_p * K - B_p\|^2$ is a perpendicular direction fidelity term that includes $L_p$ (the latent sharp image derivative along the perpendicular direction), and $B_p$ (the blurred image derivative along the perpendicular direction); (v) $\xi_d$ is the dominant fidelity term weight for the dominant direction fidelity term; and (vi) $\xi_p$ is the perpendicular fidelity term weight for the perpendicular direction fidelity term. As provided above, the derivatives can be computed using x and y derivatives.

In this example, the fidelity term weights can be sized to emphasize the dominate direction fidelity term and de-emphasize the perpendicular direction fidelity term if the blurred image contains many dominate edges. Thus, the dominant direction fidelity term weight will have a value that is greater than or equal to the perpendicular direction fidelity term weight ($\xi_d \geq \xi_p$).

Further, Equation 18, includes (i) the regularization terms $\|K\|^2$ and $(\|K_x\|^2 + \|K_y\|^2)$, and (ii) $\theta$ and $\sigma$ are regularization term weights somewhat similar to Equation 4. In Equation 18, the subscripts x and y again denote derivatives in x- and y-direction.

As provided herein, in one non-exclusive embodiment, the following method can be used for estimating/computing (i) the dominate direction d, (ii) the perpendicular direction p, (iii) the dominate direction fidelity term weight and (iv) the perpendicular direction fidelity term weight $\xi_p$. It should be noted that other methods can be used for these calculations.

First, the latent sharp image derivatives are calculated for the x- and y-directions ($L_x$ and $L_y$). Next, a gradient magnitude G can be calculated. The gradient magnitude can be calculated with the following equation $G = (L_x + L_y)^{1/2}$.

Next, (in an optional step) a threshold for significant gradient magnitude is selected. Subsequently, the thresholding is applied to the gradient magnitudes G of the pixels (all values that are smaller than the threshold are set to 0). Next, for each pixel for which the gradient magnitude is greater than zero (G>0), the gradient direction is computed. Subsequently, the computed directions are "rounded" or "quantized" to be one of the limited number of directions ("$\phi$"), e.g. the eight directions provided above. Next, for each of the directions, the following is computed:

$$s_\phi = G_{i_\phi}^t. \quad \text{Equation (19)}$$

In Equation 19, (i) $s_\phi$ is the overall gradient strength in the direction $\phi$, and (ii) $G_{i_\phi}$ is gradient magnitude at the pixel $i_\phi$. In Equation 15, summing over all pixels $i_\phi$ for which $G_{i_\phi} > 0$ and the gradient direction equals $\phi$. Here, t is a parameter that can be selected to fine tune the performance of the algorithm. In certain experiments, t=0 often yielded the best performance, but other values, such as t=2, may sometimes be useful.

Next, the direction perpendicular p to the most dominant edges is determined (p=arg max $s_\phi$). Subsequently, the direction of most dominant edges d is calculated (d=p+π/2).

Next, a normalization constant r can be calculated using equation 16:

$$r = (s_d + s_p)/2 \quad \text{Equation (20).}$$

In Equation 20, (i) $s_d$ is the gradient strength for the dominant direction, and (ii) $s_p$ is the gradient strength for the perpendicular direction.

Further, (i) the dominant fidelity term weight can be calculated using equation 21 and (ii) perpendicular fidelity term weight can be calculated using equation 22:

$$\xi_d = (s_p/r)^q \quad \text{Equation (21)}$$

$$\xi_p = (s_d/r)^q \quad \text{Equation (22).}$$

In certain embodiments, (i) the dominant fidelity term weight $\xi_d$ is greater than one ($\xi_d \geq 1$); and (ii) the perpendicular fidelity term weight $\xi_p$ is less than one ($\xi_p \leq 1$). In Equations 21 and 22, q is another parameter that can help to fine-tune the algorithm. In certain embodiments, the default value is one (q=1), but it can be increased to emphasize the dominant edge direction more strongly.

In certain embodiments, the PSF estimation cost function provided in Equation 18 is used only in blurred images or segments in blurred images that contain strong straight edges.

It should be noted that the closed form formula for the minimum of the cost function in Equation 18 can be derived and the minimum can be computed efficiently using FFT, similarly as in the case of Equation 2. This will speed up the estimation of the PSF blur kernel and deblurring of images and will allow for image deblurring with less powerful processors (e.g. processors in cameras). The Fourier domain closed form formula for Equation 18 can be expressed as follows:

$$F(K) = \frac{((\varepsilon_p |F(D_p)|^2 + \varepsilon_d |F(D_d)|^2 (\overline{F(L)}) F(B))}{((\varepsilon_p |F(D_p)|^2 + \varepsilon_d |F(D_d)|^2 |F(L)|^2 + \theta + \sigma(|F(D_x)|^2 + |F(D_y)|^2))}. \quad \text{Equation (23)}$$

It should be noted that in Equation (23) the symbol is expressed as "$\epsilon$".

The new algorithms provided herein help to improve the accuracy of PSF estimation by reducing the appearance of artifacts in estimated PSFs that are due to strong lines in the image. Further, the increase in computational complexity is only small.

Figure 6:
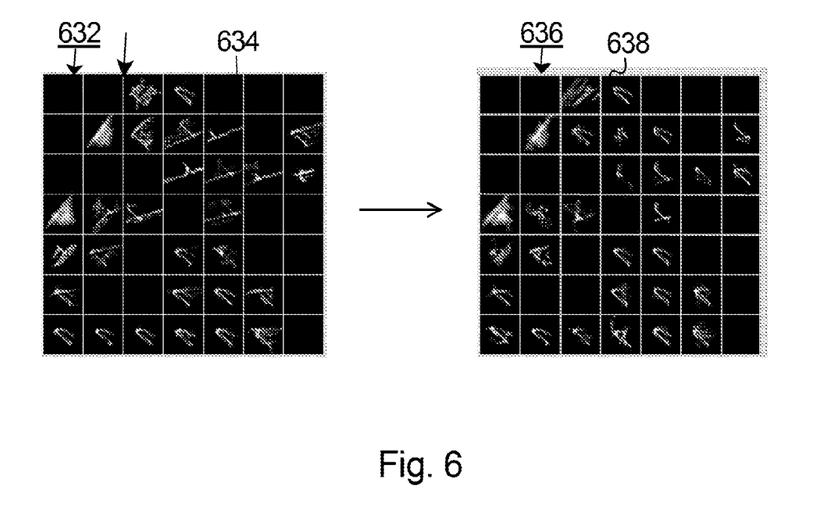
FIG. 6 illustrates (i) an estimated PSF kernel for some of the segments of the captured image of FIG. 2, determined with a prior art PSF estimation cost function, and (ii) an estimated PSF kernel for some of the segments of the captured image of FIG. 2, determined with a second PSF estimation cost function having features of the present invention.

FIG. 6 illustrates a prior art PSF map 632 (on the left) that includes an estimated PSF kernel 634 for some of the segments of the captured image of FIG. 5, determined with a prior art PSF estimation cost function. As illustrated in FIG. 6, some of the estimated PSF kernels 634 contain strong, undesirable artifacts having the form of streaks that extend along the dominant edge direction of the strong edges 20.

FIG. 6 also illustrates a new PSF map 636 (on the right) that includes an estimated PSF kernel 638 for some of the segments of the captured image of FIG. 5, determined with the PSF estimation cost function of Equation 18. As illustrated in FIG. 6, the estimated PSF kernels 638 have less undesirable artifacts having the form of streaks that extend along the dominant edge direction.

It should be noted that embodiments provided herein are merely non-exclusive examples, and that modifications to the PSF image estimation cost functions provided herein are possible. For example, the 2-norm (the square root of the sum of squares) can be replaced by 1-norm (the sum of absolute values, total variation) in Equations 3, 4 and/or 18. Using 1-norm instead of 2-norm is believed to help to promote sparseness more strongly. In comparison with 2-norm, 1-norm tends to make most elements smaller while allowing a few elements to be bigger. 1-norm is believed by some to reflect the properties of natural images more accurately and to help to improve the quality of deblurred images, because it allows for sharper edges.

While the current invention is disclosed in detail herein, it is to be understood that it is merely illustrative of the presently preferred embodiments of the invention and that no limitations are intended to the details of construction or design herein shown other than as described in the appended claims.

What is claimed is:

1. A method for deblurring a blurry image, the method comprising the step of:
   estimating a PSF kernel of at a least a portion of the image using a PSF cost function having (i) a first fidelity term that includes a derivative in a first direction, (ii) a first weight for the first fidelity term, (iii) a second fidelity term that includes a derivative in a second direction that is different from the first direction, (iv) a second weight for the second fidelity term, the second weight being different from the first weight, (v) a third fidelity term that includes a derivative in a third direction, and (vi) a third weight for the third fidelity term, wherein the third direction is different from the first direction and the second direction, and wherein the third weight is different from the second weight and the first weight; and
   deblurring the image utilizing the estimated PSF kernel.

2. The method of claim 1 wherein the step of estimating includes the PSF cost function having (i) a fourth fidelity term that includes a derivative in a fourth direction, and (ii) a fourth weight for the fourth fidelity term; wherein the fourth direction is different from the first direction, the second direction, and the third direction; and wherein the fourth weight is different from the third weight, the second weight, and the first weight.

3. The method of claim 2 wherein the step of estimating includes the PSF cost function having (i) a fifth fidelity term that includes a derivative in a fifth direction, and (ii) a fifth weight for the fifth fidelity term; wherein the fifth direction is different from the first direction, the second direction, the third direction, and the fourth direction; and wherein the fifth weight is different from the fourth weight, the third weight, the second weight, and the first weight.

4. The method of claim 3 wherein the step of estimating includes the step of utilizing steerable derivatives in a formula for the minimum of a cost function in terms of an X derivative and a Y derivative, and pre-computing the weights for the fidelity terms.

5. The method of claim 3 wherein the image includes strong edges, and wherein the step of estimating includes the step of assigning values to the weights to emphasize the directions that coincide with the directions of the strong edges.

6. The method of claim 1 wherein the step of estimating includes the step of utilizing steerable derivatives in a formula for the minimum of a cost function in terms of an X derivative and a Y derivative, and pre-computing the weights for the fidelity terms.

7. The method of claim 1 wherein the derivative in the first direction can be written as a linear combination of a derivative in the third direction, and a derivative in a fourth direction; wherein the derivative in the second direction can be written as a linear combination of the derivative in the third direction, and the derivative in the fourth direction; wherein the third direction is different from the first direction and the second direction; and wherein the fourth direction is different from the first direction, the second direction, and the third direction.

8. The method of claim 1 wherein the image includes strong edges, and wherein the step of estimating includes the step of estimating a dominant edge direction; wherein if the first direction is closer to the dominant edge direction than the second direction, the first weight is assigned a value that is greater than the second weight; and wherein if the second direction is closer to the dominant edge direction than the first direction, the second weight is assigned a value that is greater than the first weight.

9. The method of claim 1 further comprising the steps of (i) determining the dominant edge direction of at least a portion of the image; and (ii) determining a perpendicular direction that is perpendicular to the dominant edge direction; wherein the step of estimating a PSF kernel includes the first direction being in the dominant edge direction, and the second direction being in the perpendicular direction.

10. The method of claim 9 wherein the step of estimating a PSF kernel includes the step of assigning a greater value to the first weight than the second weight.

11. The method of claim 1 further comprising the step of minimizing the PSF estimation cost function using fast Fourier transform.

12. The method of claim 1 wherein the PSF estimation cost function includes a regularization term.

13. The method of claim 1 wherein the PSF estimation cost function is a modified regularized least squares cost function.

14. A method for deblurring a blurry image that includes a dominant edge direction, the method comprising the steps of:
   estimating the dominant edge direction of at least a portion of the image;
   determining a perpendicular direction that is perpendicular to the estimated dominant edge direction;
   estimating a PSF kernel for at least a portion of the image with a PSF cost function having (i) a first fidelity term having a derivative that is in the dominant edge direction, (ii) a first weight for the first fidelity term, (iii) a second fidelity term having a derivative that is in the perpendicular direction, and (iv) a second weight for the second fidelity term, and wherein the second weight has a different value than the first weight; and
   deblurring the image utilizing the estimated PSF kernel.

15. The method of claim 14 wherein the step of estimating a PSF kernel includes the step of assigning a value to the first weight that is greater than the second weight.

16. The method of claim 14 further comprising the step of minimizing the PSF estimation cost function using fast Fourier transform.

17. The method of claim 14 wherein the PSF estimation cost function includes a regularization term.

18. The method of claim 14 wherein the PSF estimation cost function is a modified regularized least squares cost function.

19. A method for deblurring a blurry image comprising the step of: estimating a PSF kernel of at a least a portion of the image using a PSF cost function having (i) a first fidelity term that includes a derivative in a first direction, (ii) a first weight for the first fidelity term, (iii) a second fidelity term that includes a derivative in a second direction that is different from the first direction, and (iv) a second weight for the second fidelity term, the second weight being different from the first weight; wherein the derivative in the first direction can be written as a linear combination of a derivative in a third direction, and a derivative in a fourth direction; wherein the derivative in the second direction can be written as a linear combination of the derivative in the third direction, and the derivative in the fourth direction; wherein the third direction is different from the first direction and the second direction; and wherein the fourth direction is different from the first direction, the second direction, and the third direction; and
deblurring the image utilizing the estimated PSF kernel.

20. A method for deblurring a blurry image that includes strong edges, the method comprising the step of:
estimating a dominant edge direction of at least a portion of the image;
estimating a PSF kernel for at a portion of the image using a PSF cost function having (i) a first fidelity term that includes a derivative in a first direction, (ii) a first weight for the first fidelity term, (iii) a second fidelity term that includes a derivative in a second direction that is different from the first direction, and (iv) a second weight for the second fidelity term, the second weight being different from the first weight; wherein if the first direction is closer to the dominant edge direction than the second direction, the first weight is assigned a value that is greater than the second weight; and wherein if the second direction is closer to the dominant edge direction than the first direction, the second weight is assigned a value that is greater than the first weight; and
deblurring the image utilizing the estimated PSF kernel.

* * * * *